United States Patent
Peterson

(10) Patent No.: US 10,095,702 B2
(45) Date of Patent: Oct. 9, 2018

(54) SYSTEMS AND METHODS FOR GENERATING AND IMPLEMENTING A CUSTOM DEVICE DESCRIPTION FILE

(71) Applicant: Dale Peterson, Waukesha, WI (US)

(72) Inventor: Dale Peterson, Waukesha, WI (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 13/842,897

(22) Filed: Mar. 15, 2013

(65) Prior Publication Data
US 2014/0280351 A1    Sep. 18, 2014

(51) Int. Cl.
*G06F 17/30*    (2006.01)

(52) U.S. Cl.
CPC .... *G06F 17/30141* (2013.01); *G06F 17/3007* (2013.01); *G06F 17/30067* (2013.01); *G06F 17/30094* (2013.01); *G06F 17/30227* (2013.01)

(58) Field of Classification Search
CPC .......... G06F 17/30141; G06F 17/3007; G01N 21/8851; G06K 9/3233
USPC ............... 707/736, 821, 826, 827, 802, 803; 358/1.13; 713/1; 709/223; 714/727
See application file for complete search history.

(56) References Cited

U.S. PATENT DOCUMENTS

| | | | |
|---|---|---|---|
| 4,433,376 A | 2/1984 | Lombardo, Jr. et al. | |
| 4,559,614 A | 12/1985 | Peek et al. | |
| 5,627,972 A | 5/1997 | Shear | |
| 5,682,392 A * | 10/1997 | Raymond | G01R 31/2815 714/30 |
| 5,699,524 A | 12/1997 | Ooishi et al. | |
| 6,175,644 B1 * | 1/2001 | Scola | G01N 21/8851 117/201 |
| 6,425,116 B1 * | 7/2002 | Duboc | G06F 17/5045 712/35 |
| 6,614,916 B2 * | 9/2003 | MacDonald | G06K 9/3233 209/584 |
| 6,895,549 B1 * | 5/2005 | Albright | G06K 1/121 101/2 |
| 6,931,602 B1 * | 8/2005 | Silver | G05B 19/409 715/771 |
| 7,089,330 B1 * | 8/2006 | Mason | G06F 17/30876 707/999.005 |
| 7,184,922 B2 * | 2/2007 | Ousley | G08C 19/00 702/121 |

(Continued)

FOREIGN PATENT DOCUMENTS

| | | |
|---|---|---|
| JP | 2010218083 A | 9/2010 |
| JP | 2011238094 A | 11/2011 |

OTHER PUBLICATIONS

Rowley, Vincent. "Standard Gives Machine Vision Systems a New Image." Dated Jan. 1, 2012. pp. 1-5. http://www.vision-systems.com/articles/print/volume-17/issue-1/departments/leading-edge-views/standard-gives-machine-vision-systems-a-new-image.html.

(Continued)

*Primary Examiner* — Frantz Coby
(74) *Attorney, Agent, or Firm* — Quarles & Brady LLP

(57) ABSTRACT

Systems and methods generate custom device description files using a device description file generator. The systems and methods include a processor and a memory medium. The custom device description file is communicated to one or more devices to configure the respective devices to be able to accept and communicate data defined by the custom device description file.

16 Claims, 6 Drawing Sheets

(56) References Cited

U.S. PATENT DOCUMENTS

| | | | |
|---|---|---|---|
| 7,194,569 | B1 | 3/2007 | Shaylor |
| 7,222,313 | B2 * | 5/2007 | Bullis ................. H04L 41/0803 710/8 |
| 7,872,765 | B2 * | 1/2011 | Liu ....................... G06F 3/1206 358/1.13 |
| 7,961,201 | B1 * | 6/2011 | Fix ....................... G06T 7/0004 345/629 |
| 8,073,879 | B2 | 12/2011 | Meijer et al. |
| 8,266,110 | B1 * | 9/2012 | Sridharan ......... G06F 17/30073 707/640 |
| 2001/0004745 | A1 * | 6/2001 | Villalpando .................. 709/223 |
| 2005/0081023 | A1 * | 4/2005 | Bullis et al. ...................... 713/1 |
| 2006/0294176 | A1 | 12/2006 | Machida et al. |
| 2007/0150816 | A1 * | 6/2007 | Hariki .................... G06Q 10/06 715/733 |
| 2007/0195352 | A1 * | 8/2007 | Liu ....................... G06F 3/1206 358/1.13 |
| 2008/0189095 | A1 | 8/2008 | Chen et al. |
| 2009/0228495 | A1 * | 9/2009 | MacDonell ............... G06F 8/63 |
| 2011/0270831 | A1 * | 11/2011 | Xie et al. ...................... 707/736 |
| 2011/0317012 | A1 * | 12/2011 | Hammadou ........... G06K 9/468 348/143 |

OTHER PUBLICATIONS

"Powerlink XML Device Description Editor." Product Description. Dated 2009. Distributed by port GmbH.

* cited by examiner

SYSTEMS AND METHODS FOR GENERATING AND IMPLEMENTING A CUSTOM DEVICE DESCRIPTION FILE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE TECHNOLOGY

The present technology relates to device descriptions, and more specifically, to generating and implementing a custom device description file.

A communication protocol can be described as a system of digital message formats and rules. The protocol is used for exchanging digital messages between devices on a network that are capable of transmitting and/or receiving the particular message format. These messages are sent and received by devices on the network to establish communications and transfer one or more data items between the devices. The communication protocol supports the transportation of data items between two or more devices on the network. A device manufacturer or vendor utilizing such a protocol typically configures the device software and/or firmware responsible for generating the data items to generate a fixed form of data items so the vendor's device is able to transmit and receive communications in a configuration that is most efficient for the vendor's device and within the bounds of the communication protocol rules.

The fixed form of data items can be described in a device description file (DDF). The DDF is created by the vendor, and is an electronic data file that define specific and fixed data items for a specific device. The DDF describes parameters and data in the device that are accessible to other devices that communicate with the device. When a second device on a network wants to communicate with the vendor's device, the configuration tool for the second device on the network is provided with the vendor's DDF, so the second device on the network knows what parameters and data in the vendor's device are accessible.

However, in some applications, additional data needs to be communicated from one device to another that is not described in the vendor's DDF. This may be due to a customer's request that the vendor's device support a modified or completely different data item form or structure to facilitate an application defined data item and/or improving the communication efficiency, maintain compatibility with legacy devices, or compatibility with competitors devices. In order to accommodate unsupported data items, the device vendor, for example, most often must perform exclusive changes to the software and/or firmware of the vendor's device. Software/firmware changes are expensive, time consuming, and difficult to manage, as they are typically specific to a customer's request for a particular application, and are rarely transferrable to be used by other customers. Most vendors are reluctant to make these unique changes for a single customer because of these reasons.

One exemplary technical field that may use a communication protocol for communications and the transfer of data items is the field of machine vision or image processing analysis. In its simplest form, machine vision is typically used to inspect and/or locate an object. For example, in manufacturing applications, machine vision analysis may be used to detect defects in a manufactured object by acquiring images of the object and using various types of image processing algorithms to analyze the images. As an example, a system to manufacture electrical components such as resistors may use machine vision to examine the resistor in order to detect manufacturing defects, and ensure that the resistor is sized and shaped properly. A large amount of data can be collected and analyzed during the machine vision process. Not only must some or all of this data be communicated to other devices, instructions and other application related data can also be communicated to and from the machine vision system.

There are data conversion packages and industrial gateway devices available that allow a user to convert data from one device that operates using a first data format to another device that operates using a data format different than the first. These systems are mainly available in the field of information processing systems or database systems, and are mainly for the purpose of converting data one time from one system to another. However, these systems do not address the need to generate DDFs (file structure including data items defined by the device vendor), and they are not capable of communicating a changed data item structure to a device on the network.

What is needed are systems and methods that allow dynamically generated custom data content and format to be communicated from one device on a network to another device on the network.

BRIEF SUMMARY OF THE TECHNOLOGY

The present embodiments overcomes the disadvantages of the prior art by providing systems and methods for generating and implementing a custom DDF. A DDF generator is used to generate the custom DDF. The custom DDF can be communicated to a device on a network, or to a configuration tool associated with the device. The device can then be configured to be able to accept and communicate data defined by custom DDF.

Accordingly, some embodiments comprise systems and methods for generating a custom device description file. The system comprises a processor, the processor including a memory medium, the memory medium including a device description file generator, the processor operable to execute the device description file generator. The device description file generator is operable to receive a description of a data item included in a network item from a first device. The device description file generator operable to generate a custom device description file that describes the data item included in the network item.

Additional embodiments comprise systems and methods for a device description file generator. The device description file generator comprises a device, the device including a network item and a network interface, the device operable to communicate on a communication network, the network item including a data item. The device includes a configuration tool, the configuration tool operable to read a description of the data item in the network item and generate a custom device description file, the device description file including a description of the data item.

Consistent with the above, some embodiments include a method for creating a custom device description file. The method includes mapping a data item from a device into a network item, the network item residing in a memory in the device; using a device description file generator, reading a description of the mapped data item; and generating a custom device description file including at least a portion of the description of the mapped data item.

To the accomplishment of the foregoing and related ends, embodiments of the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
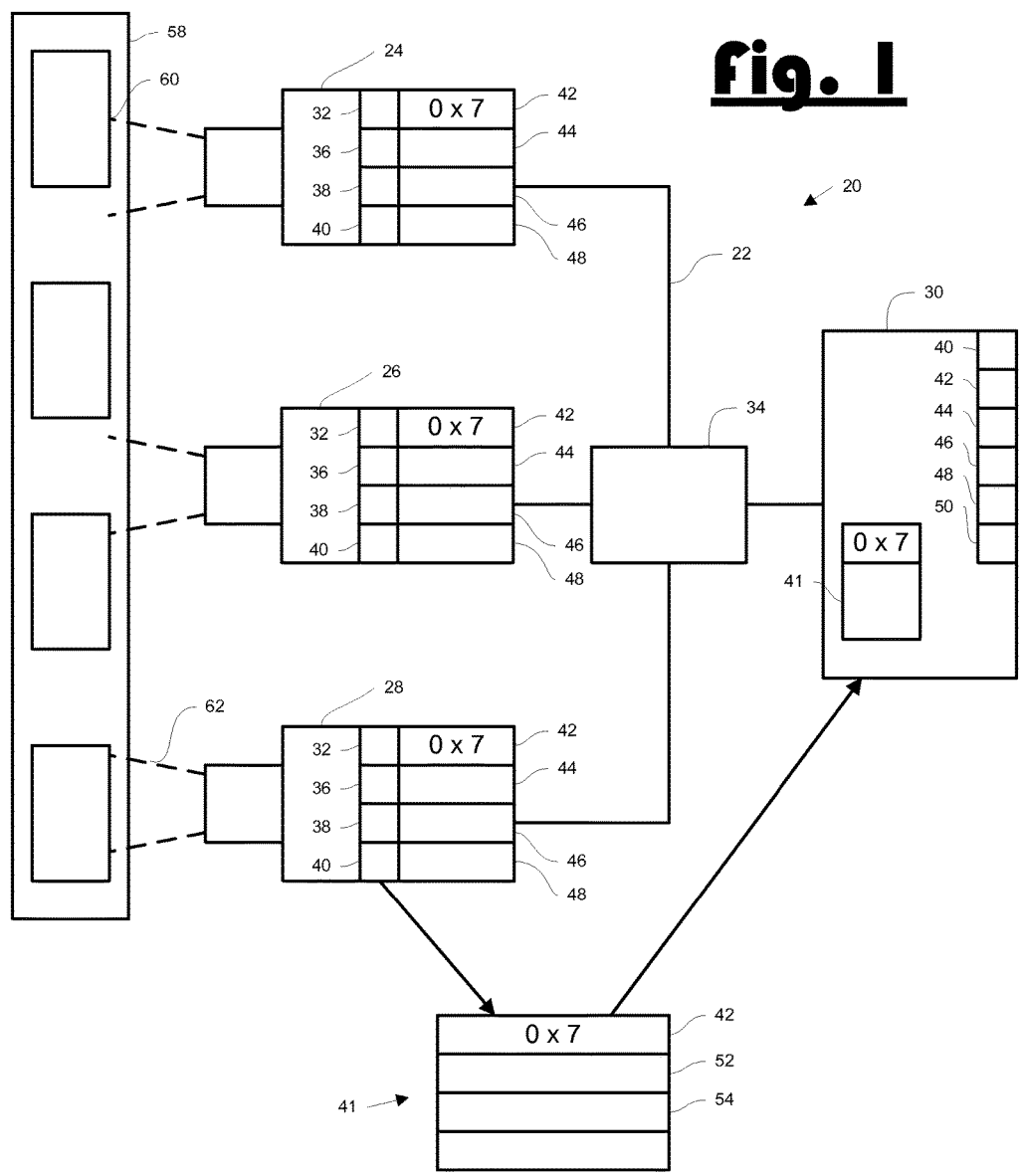
FIG. 1 is a schematic view of a typical system including several devices on a network, each device including data in a preconfigured form, and able to communicate with each other across a network.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a processor-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" as used herein is intended to encompass a computer program accessible from any computer-readable device, carrier, or media. For example, computer readable media can include but are not limited to magnetic storage devices, smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to these configurations without departing from the scope or spirit of the claimed subject matter.

Embodiments of the technology are described below by using diagrams to illustrate either the structure or processing of embodiments used to implement the systems and methods of the present technology. Using the diagrams in this manner to present embodiments of the technology should not be construed as limiting of its scope. The present technology contemplates both methods and systems for dynamically generating custom DDFs. The embodiments of the present disclosure may comprise a device, e.g., an automation device, a special purpose or general purpose computer including various computer hardware, software, and/or firmware, etc., as discussed in greater detail below.

The various embodiments of the technology will be described in connection with a machine vision system comprising a plurality of devices on a network. In some embodiments, the machine vision system includes a DDF generator used to manually or dynamically configure a DDF that incorporates one or more data items not supported by one or more of the devices on the network. That is because the features and advantages of the technology are well suited for this purpose. Still, it should be appreciated that the various aspects of the technology can be applied in other forms and in system configurations and in any other devices capable of utilizing a DDF.

An exemplary machine vision system may use image processing software operable to perform any of various types of image analysis or image processing functions or algorithms in examining an acquired image of an object. Any type of camera or other imaging device may be used to acquire the images to be analyzed in a machine vision application, including digital cameras, line scan cameras, infrared imaging devices, x-ray imaging devices, ultra-sonic imaging devices, and any other type of device which operates to receive, generate, process, or acquire an image or sensor data. As is known to one of skill in the art, the image acquisition, analysis, and/or processing functions described above includes the generation and transmission of data.

FIG. 1 illustrates an exemplary machine vision system 20 coupled to a network 22, such as a local area network (LAN), a wide area network (WAN), a wireless network, or the Internet, to which the teachings of this technology may be applied. The machine vision system 20 may be used in a manufacturing assembly, test, measurement, automation, and/or control application, among others, as non-limiting examples.

The exemplary machine vision system 20 is shown to include three imaging devices 24, 26, 28 coupled to fourth device 30 through a network router 34. Each imaging device 24, 26, 28 may include a processor 32, a memory medium 36, and a machine vision application 38 for performing an image processing function. As used herein, the term "imaging device" is intended to include any of various types of devices that are operable to acquire and/or store an image and that may include on-board processing capabilities. An imaging device may thus be further operable to analyze or process the acquired or stored image. Examples of an imaging device include analog and digital cameras with on-board processors, and other similar types of devices.

The term "device" as used herein includes computers, robots, machines, programmable logic controllers (PLCs), machine vision systems, and sensors, and there are countless others known to one of skill in the art. Thus, it should be noted that, while the description references a machine vision system as the exemplary operative configuration, the teachings described and claimed herein should be taken as broadly applicable to any system configuration and a wide range of devices capable of communicating data items across a network using a communication protocol.

As used herein, the term "processor" may include one or more processors and memories and/or one or more programmable hardware elements. As used herein, the term "processor" is intended to include any of types of processors, CPUs, microcontrollers, or other devices capable of executing software instructions. As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

As used herein, the term "memory medium" includes a non-volatile medium, e.g., a magnetic media or hard disk, optical storage, or flash memory; a volatile medium, such as computer system memory, e.g., random access memory (RAM) such as DRAM, SRAM, EDO RAM, RAMBUS RAM, DR DRAM, etc.; or an installation medium, such as software media 66, e.g., a CD-ROM, or floppy disks, on which the computer programs may be stored and/or data communications may be buffered. The term "memory medium" may also include other types of memory or combinations thereof.

Each imaging device 24, 26, 28 and the fourth device 30 may include data in a preconfigured form 40, a device ID 42, a network address 44, a network interface 46, and possibly a configuration tool 48. Each will be described in greater detail below. In this example, if each imaging device 24, 26, 28 were the same type of imaging devices, the data in the preconfigured form 40 would contain the same information for each of the imaging devices. For explanation purposes, an example of a simplified device description file 41 as supplied by the vendor of imaging device 28 is shown. The DDF 41 includes the device ID 42, and two vendor defined data item fields 52 and 54, although more or less are possible. For example, vendor defined data items for an imaging device may include image number and image size. These data items would be considered standard data available from an imaging device, and therefore likely to be included in a vendor supplied DDF. As can be seen, the DDF 41 has been communicated to the fourth device 30 so the fourth device 30 has an understanding of the imaging device 28 and the vendor supplied data items coming from the imaging device 28.

FIG. 1 also shows a conveyor 58 that may be used to move a plurality of objects 60. These objects pass, in turn, within a field of view (FOV) 62 of the imaging devices 24, 26, 28, so that their runtime images can be acquired and inspected, e.g., for flaws and/or measurements other features of interest during an inspection process.

Figure 2:
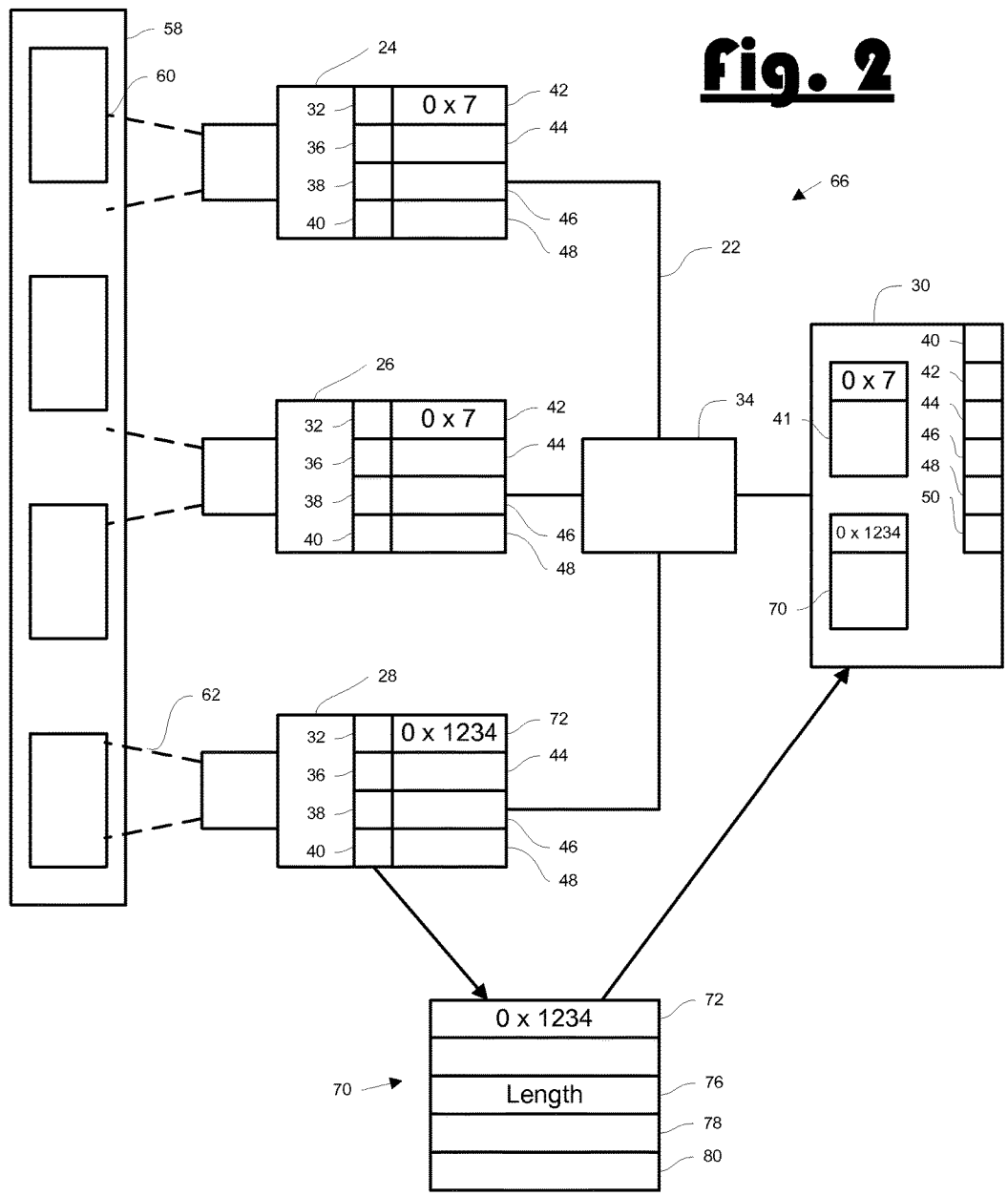
FIG. 2 is a schematic view of a system including several devices on a network similar to FIG. 1, where one of the devices has had it's DDF reconfigured and communicated to a second device on the network, according to embodiments of the technology.

Referring now to FIG. 2, an imaging system 66 is shown that is similar to the imaging system 20 of FIG. 1, except where a custom DDF 70 has been generated for imaging device 28 and the custom DDF 70 has been communicated to the fourth device 30. In this embodiment, the custom DDF 70 includes a new device ID 72, shown as 0x1234, and a custom process variable for this particular application, that being a new data item named "length" 76. The remaining fields 78 and 80 can contain vendor supplied data items. In this example, imaging device 28 acquires one or more images of the object 60, and using the machine vision application 38, analyzes the image to generate a value for length 76. As show and described with reference to FIG. 1, the vendor supplied DDF 41 did not contain a data item that could include data for length 76 of the object 60. With the custom DDF 70 communicated to the fourth device 30, the fourth device 30 now has an understanding of the imaging device 28 and the custom data item length 76 defined by a user of the imaging system 66.

Figure 3:
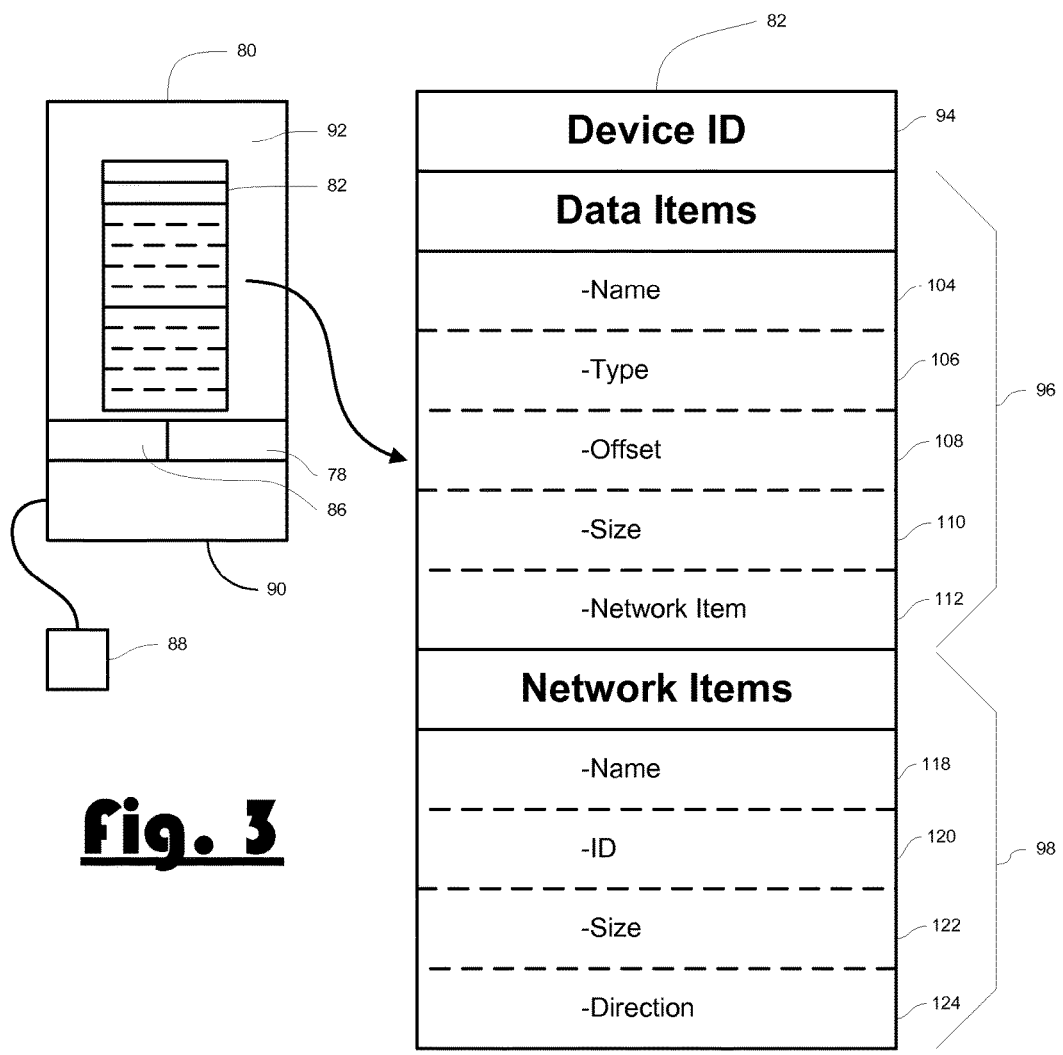
FIG. 3 is a schematic view showing a DDF generator, and showing a representative custom DDF format and representative data fields, according to embodiments of the technology.
Figure 4:
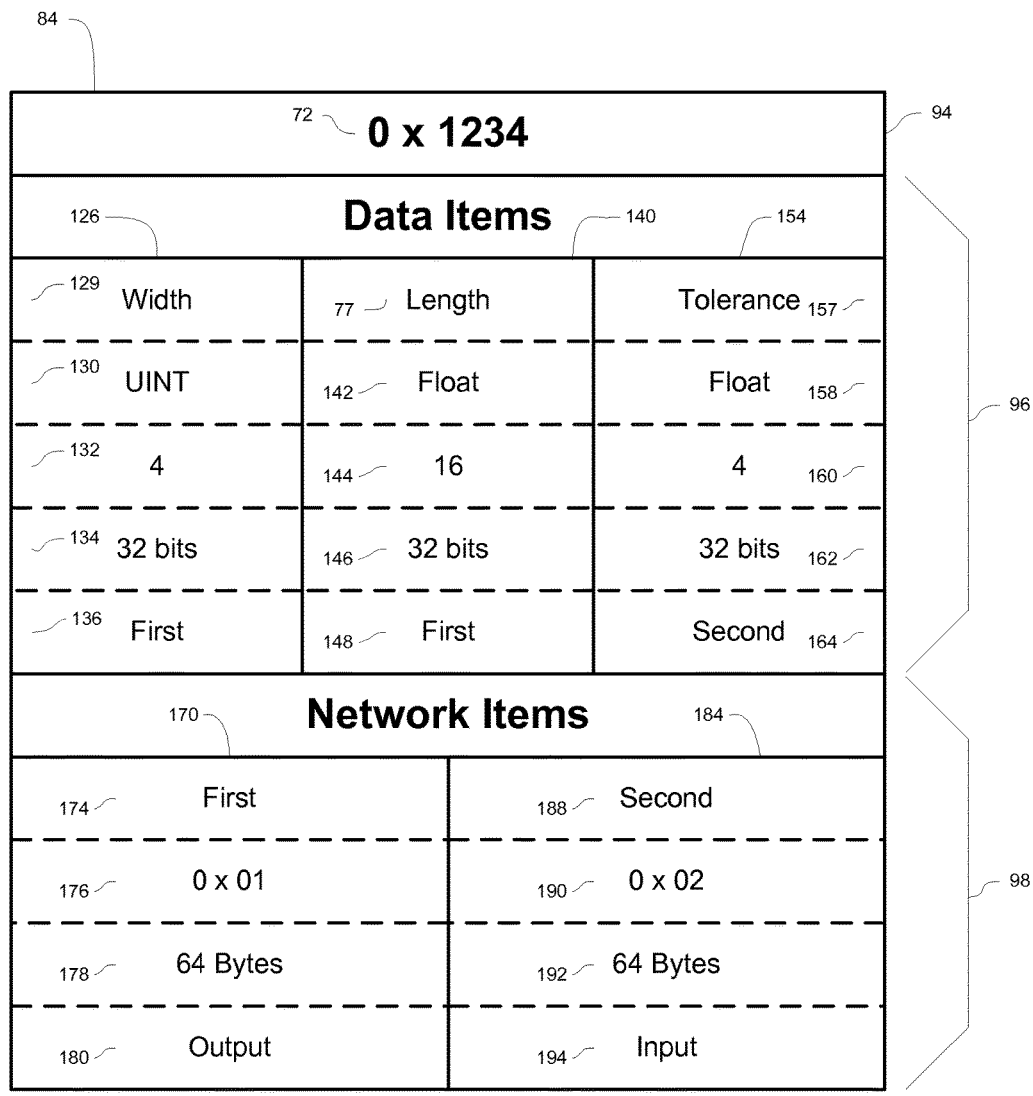
FIG. 4 is a schematic view showing the custom DDF of FIG. 3, except with exemplary data in the data fields, according to embodiments of the technology.

Referring to FIGS. 3 and 4, a DDF generator 78 usable to manually or dynamically generate a custom DDF 82 is shown. The custom DDF 82 is shown in detail with field names provided to define an exemplary construction of a custom DDF 82. Then in FIG. 4, a custom DDF 84 is shown including exemplary data for each of the fields described in the custom DDF 82 of FIG. 3. In some embodiments, a user can manually enter data into each of the fields described in custom DDF 82. In other embodiments, the data can by dynamically entered in some or all of the fields by instructing the DDF generator 78 to query some or all of the data from a device. In yet other embodiments, the DDF generator 78 can automatically receive data from a device for the generation of a custom DDF 82.

The DDF generator 78 can comprise an application executable on a computer 80 or other such computing device, or, the DDF generator 78 can be an application running on a device on the network 22. The computer 80 is shown including a processor 86 and user interface components, such as, but not required, a mouse 88, keyboard 90 and display 92. Other types of computing devices and interfaces can also be employed, such as a Personal Digital Assistant (PDA), a laptop, a human machine interface, or a tablet device, in alternate embodiments. In some embodiments, the DDF generator 78 may be coupled to, reside in, execute on, and/or communicate with, the imaging device 28 and associated machine vision application 36 for dynamic generation of a custom DDF.

In some embodiments, the DDF generator 78 may reside and/or execute on the imaging device 28. The DDF generator 78 may also be part of the machine vision application 36, and may be accessed using the computer 80. In other embodiments, the DDF generator 78 may reside and/or execute on the computer 80, or may include components that reside and/or execute on the imaging device 28 and on the computer 80.

The DDF generator 78 is operable to provide the user the means to generate a custom DDF 82. The DDF generator 78 may generate and store the user defined custom DDF 82, which can then be consumed at runtime by other devices on the network 22. In the embodiment described, the DDF generator 78 may be an offline tool that a user uses to enter and save some or all of the custom DDF 82 information. In some embodiments, the DDF generator 78 may be an online, i.e. runtime, tool.

Embodiments of the DDF generator 78 described herein provide customizable reorganization of data items including the ability to configure the layout, content, and value of communicated data items without modification of the transmitting or receiving device's software and/or firmware. In essence, by using the DDF generator 78 to define the relationship between a network item and one or more data items in a custom DDF 82, the DDF generator 78 is able to use the custom defined relationship in the custom DDF 82 to map data that is externally visible on the network 22 (described as a network item) to the data content and format of data items that is native to a vendor's device, and, to map data content and format that is native to the vendor's device to data that is visible on the network 22. The user is no longer dependent on the form of the vendor's preprogrammed data format and associated vendor supplied DDF 41. The user can now define their own preferred data format in a custom DDF 82 and still interact with the vendor's device and other devices on the network, without requiring the vendor to create custom software and/or firmware.

As seen in FIG. 3, the custom DDF 82 can include a plurality of fields. In an exemplary embodiment, the custom DDF 82 includes a device ID field 94. The device ID field 94 provides a unique ID for the custom DDF 82. The custom DDF 82 can be broken into two primary regions, a data item region 96 and a network items region 98. The data items region 96 defines the structure of custom network items usable by devices on the network 22. The network items region 98 defines a communication path for each network item that is being used by the device for which the custom DDF 82 is being created, to be described in greater detail below with regard to FIGS. 4 and 5. The data items region 96 can include a variety of fields, including name 104, type 106, offset 108, size 110, and network item 112. Similarly, the network items region 98 can include a variety of fields, including name 118, ID 120, size 122, and direction 124.

Figure 5:
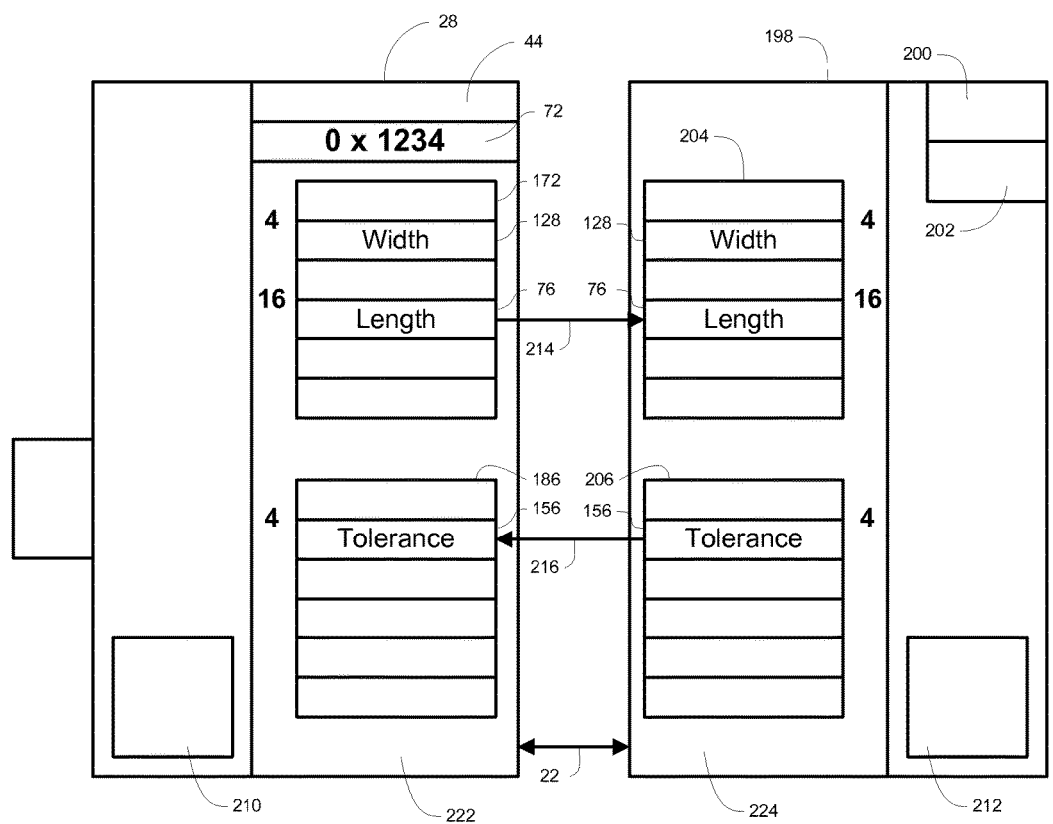
FIG. 5 is a schematic view of a simplified system similar to FIG. 2, and including only two devices on the network, the first device including new data items and the second device configured to communicate with the first device.

An exemplary embodiment of a custom DDF 84 including possible data is shown in FIG. 4, and FIG. 5 shows network devices 28 and 198 that incorporate network items 172 and 186 for communication between devices. Specifically, the custom DDF 84 includes a unique device ID 72, shown as 0x1234, in the device ID field 94. The data items region 96 is shown to include definition for three data items associated with the imaging device 28. The first data item region 126 defines a data item 128 named "width". Data item width 128 is given the name width 129 and is defined as a type UINT 130, with an offset of four 132, a size of thirty-two 32 bits 134, and residing in a first network item 136. Similarly, the second data item region 140 defines the previously identified data item 76 named "length". Data item length 76 is given the name length 77 and is defined as a type Float 142, with an offset of sixteen 144, a size of thirty-two 32 bits 146, and residing in a first network item 148. Lastly, in this exemplary embodiment, a third data item region 154 defines a data item 156 named "tolerance". Data item tolerance 156 is given the name tolerance 157 and is defined as a type Float 158, with an offset of four 160, a size of thirty-two 32 bits 162, and residing in a second network item 164.

The network items region 98 is shown to include the definition for two network items associated with the imaging device 28. The first network item region 170 defines a first network item 172 (see FIG. 5), which is named a first 174 network item. Network item 172 is defined with an ID 176 shown as 0x01, a size of sixty-four bytes 178, and having an output direction 180. The second network item region 184 defines a second network item 186 associated with imaging device 28 (see FIG. 5), which is named a second 188 network item. Network item 186 is defined with an ID 190 shown as 0x02, a size of sixty-four bytes 192, and having an input direction 194.

Referring now to FIG. 5, an exemplary embodiment of a first network device, in this embodiment imaging device 28, and a second network device 198, in this embodiment a programmable logic controller, are shown incorporating data from the custom DDF 84 shown in FIG. 4. As can be seen, the imaging device 28 includes a network address 44, and the custom ID 72 described in custom DDF 84. The imaging device 28 also includes the first network item 172 and the second network item 186. First network item 172 and second network item 186 can reside in memory 222 within the first network device 28. Within the first network item 172, data item width 128 is shown at the offset of four, and data item length 76 is shown at the offset sixteen, both offsets described in custom DDF 84. Within the second network item 186, data item tolerance 156 is shown at the offset of four, as described in the custom DDF 84.

The second network device 198, e.g., a programmable logic controller (PLC), can also include a network address 200 and a device ID 202. The second network device 198 has been configured so it can interpret data communicated to it using the data structure defined in the custom DDF 84, to be described in greater detail below with regard to FIG. 6. By using the data structure defined by the custom DDF 84, the second network device 198 can include a first network item 204 and a second network item 206 that define essentially the same structure as defined in first network item 172 and second network item 186 from the imaging device 28. First network item 204 and second network item 206 can reside in memory 224 within the second network device 198. Width 128 and length 76 are shown at offset four and sixteen, respectively, and tolerance 156 is shown at offset four. First network item 172 is now able to be communicated 214 from the imaging device 28 across the network 22 to the second network device 198 and to first network item 204, and similarly, second network item 206 is now able to be communicated 216 from the second network device 198 across the network 22 to the imaging device 28 and to second network item 186.

Figure 6:
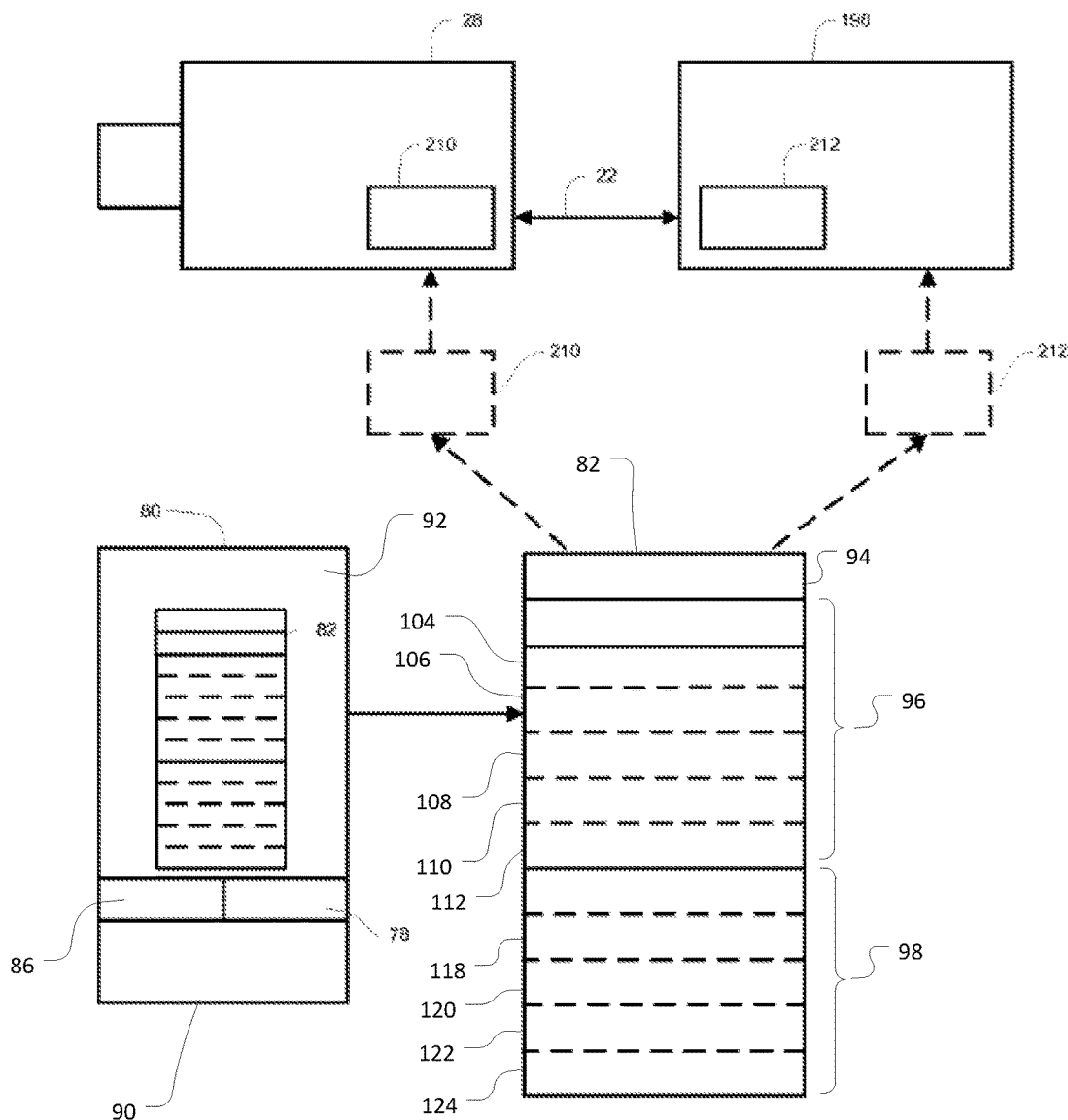
FIG. 6 is a schematic systematic view showing the generation and implementation of a dynamically generated custom DDF.

Referring to FIG. 6, an exemplary arrangement for generating a custom DDF 82 and then configuring devices 28 and 198 on the network 22 to implement the custom DDF 82 is shown. As previously described, DDF generator 78 can be used to generate the custom DDF 82. In some embodiments, each device on the network can include a configuration tool, which can be a software application, for example, that can be used to configure the device for operation. For example, imaging device 28 can include an imaging device configuration tool 210, and the second networking device 198 can include a PLC configuration tool 212. Each configuration tool 210 and 212 is able to receive a vendor defined DDF 40 and configure the respective devices to be able to accept and communicate data defined by the vendor defined DDF 40. These configuration tools 210 and 212 can also be used to configure the respective devices to be able to accept and communicate data defined by custom DDF 82.

In some embodiments, the imaging device configuration tool 210 resides on the imaging device 28 and the PLC configuration tool 212 resides on the second network device 198. In other embodiments, the imaging device configuration tool 210 can reside on computer 80 used to generate the custom DDF 82, or any other computing device. Similarly, PLC configuration tool 212 can reside on computer 80 used to generate the custom DDF 82, or any other computing device. After the custom DDF 82 is generated using the DDF generator 78, it can be communicated to the device configuration tool, e.g., the imaging device configuration tool 210 and/or the PLC configuration tool 212, and each configuration tool can be used to configure the respective devices to be able to accept and communicate data defined by custom DDF 82.

Although the present technology has been described with reference to preferred embodiments, workers skilled in the art will recognize that changes may be made in form and detail without departing from the spirit and scope of the technology. For example, embodiments of the technology are not limited to the embodiments of vision systems and associated network devices shown herein and may be practiced with numerous other devices capable of transmitting and/or receiving data on a network.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A system for generating a custom device description file, the system comprising: a processor, the processor including a memory medium, the memory medium including a device description file generator, the processor operable to execute the device description file generator; the device description file generator operable to receive a description of a data item for a machine vision system, the data item being included in a network item from a first device configured as a part of the machine vision system, the data item including one or more data-item process variables; the device description file generator operable to map the data item from the first device into the network item, the network item residing in the first device; and the device description file generator operable to generate a custom device description file for the machine vision system, the custom device description file describing the data item included in the network item and including a custom process variable that is not included in the data item and that does not correspond to any of the one or more data-item process variables, wherein the first device further includes a configuration tool, the configuration tool operable to provide the description of the data item to the device description file generator.

2. The system according to claim 1, wherein the custom device description file describes the data item and the network item.

3. The system according to claim 1, wherein the first device includes a device ID; and a configuration tool modifies the device ID and communicates the modified device ID to the device description file generator.

4. The system according to claim 3, wherein the custom device description file includes the modified device ID.

5. The system according to claim 1, wherein the processor is coupled to a network and the first device is coupled to the network, the first device able to communicate the description of the data item over the network to the processor.

6. The system according to claim 1, wherein the device description file generator communicates the custom device description file to a second device.

7. The system according to claim 6, wherein the second device includes a configuration tool, the device description file generator communicating the custom device description file to the configuration tool.

8. The system according to claim 6, wherein the second device integrates the custom device description file so the second device can communicate the data item with the first device.

9. The system according to claim 6, wherein the first device is a programmable logic controller and the second device is a second programmable logic controller.

10. The system according to claim 1, wherein the second device is a programmable logic controller.

11. A device description file generator comprising: a machine vision system including a network item and a network interface, the machine vision system operable to communicate on a communication network, the network item including a data item for the machine vision system, the data item including one or more data-item process variables; the machine vision system being configured to map the data item from the machine vision system into the network, the network item residing in a memory in the machine vision system; and the machine vision system including a configuration tool, the configuration tool operable to read a description of the data item in the network item and generate a custom device description file for the machine vision system, the custom device description file including a description of the data item and including a custom process variable that is not included in the data item and that does not correspond to any of the one or more data-item process variables, wherein the configuration tool is adapted to communicate the custom device description file across the communication network to a device on the network, the device being able to integrate the custom device description file so the device can communicate the data item with the machine vision system.

12. The system according to claim 11, wherein the custom device description file includes a description of the data item and a description of the network item.

13. A method for creating a custom device description file, the method comprising: mapping a data item from a device into a network item, the network item residing in a memory in the device, the data item includes one or more data-item process variables; using a device description file generator, reading a description of the mapped data item; and generating a custom device description file including at least a portion of the description of the mapped data item and including a custom process variable that is not included in the mapped data item and that does not correspond to any of the one or more data-item process variables, wherein the device includes a configuration tool, and reading the description of the mapped data item includes the device description file generator communicating with the configuration tool to read the description of the mapped data item.

14. The method according to claim 13, further including communicating the custom device description file to a second device.

15. The method according to claim 14, wherein the second device includes a configuration tool, and the method further including the device description file generator communicating the custom device description file to the configuration tool.

16. The method according to claim 14, wherein mapping the data item into the network item is done by a configuration tool.

\* \* \* \* \*